US006309503B1

(12) United States Patent
Martino

(10) Patent No.: US 6,309,503 B1
(45) Date of Patent: Oct. 30, 2001

(54) FLAT SKINNED DOOR THAT SIMULATES A THREE DIMENSIONAL MOLDED SKIN DOOR AND CORRESPONDING METHOD

(75) Inventor: Ralph A. Martino, Tampa, FL (US)

(73) Assignee: MDF, Inc., Fort Lauderdale, FL (US)

( * ) Notice: Subject to any disclaimer, the term of this patent is extended or adjusted under 35 U.S.C. 154(b) by 0 days.

(21) Appl. No.: 09/392,633

(22) Filed: Sep. 9, 1999

Related U.S. Application Data

(62) Division of application No. 09/019,811, filed on Feb. 6, 1998, now Pat. No. 5,950,382.

(51) Int. Cl.$^{7}$ .............................. B32B 31/12; B05D 5/06; B44F 1/08

(52) U.S. Cl. .......................... 156/277; 156/278; 427/262; 427/269; 427/267; 427/408; 53/311.1

(58) Field of Search ............................ 156/71, 277, 278; 53/311.1, 313, 314, 456, 784.1; 427/262, 264, 267, 408

(56) References Cited

U.S. PATENT DOCUMENTS

| | | | | |
|---|---|---|---|---|
| 1,934,792 | | 11/1933 | Chaffee | 41/24 |
| 3,404,502 | | 10/1968 | Miller | 52/615 |
| 3,452,861 | | 7/1969 | Erwin | 206/59 |
| 3,486,919 | | 12/1969 | Dreazy et al. | 117/8 |
| 3,608,261 | | 9/1971 | French et al. | 52/316 |
| 3,796,586 | | 3/1974 | Hanlon et al. | 117/8 |
| 3,797,904 | | 3/1974 | Krauth | 312/214 |
| 3,810,774 | | 5/1974 | Pittman | 117/12 |
| 4,771,687 | * | 9/1988 | Daunheimer . | |
| 4,882,877 | | 11/1989 | Guetle, Jr. et al. | 49/506 |
| 5,003,745 | | 4/1991 | Fang | 52/316 |
| 5,016,414 | | 5/1991 | Wang | 52/456 |
| 5,285,608 | | 2/1994 | Costello | 52/456 |
| 5,426,902 | | 6/1995 | Stahl et al. | 52/314 |
| 5,469,903 | | 11/1995 | Stanley | 144/345 |
| 5,560,168 | | 10/1996 | Gagne et al. | 52/455 |
| 5,597,620 | | 1/1997 | Martino | 427/262 |
| 5,750,240 | * | 5/1998 | Findley et al. . | |
| 5,950,382 | | 9/1999 | Martino | 52/311.1 |
| 5,989,681 | * | 11/1999 | Martino . | |
| 5,992,127 | * | 11/1999 | Quinif . | |
| 6,073,419 | * | 6/2000 | Moyes . | |
| 6,174,574 | * | 1/2001 | Martino . | |

FOREIGN PATENT DOCUMENTS 26 38 787 * 3/1978 (DE) .

* cited by examiner

*Primary Examiner*—Curtis Mayes
(74) *Attorney, Agent, or Firm*—Liniak, Berenato, Longacre & White, LLC

(57) ABSTRACT

A method of making a flat-skinned door which simulates a three-dimensional molded skin door, and corresponding product, are disclosed. The method includes the steps of applying a basecoat(s) to the door skin, applying a woodgrain puff-ink to the skin over the basecoat in order to simulate woodgrain patterning, utilizing a printing roll(s) to print a photographic image on the door which simulates a three-dimension molded door skin, and forming a hardened non-stainable polymerized coating over the image applied by the printing roll(s). In such a manner, a flat skinned door may be made which simulates a three dimensional molded skin door.

8 Claims, 3 Drawing Sheets

FLAT SKINNED DOOR THAT SIMULATES A THREE DIMENSIONAL MOLDED SKIN DOOR AND CORRESPONDING METHOD

This Application is a Divisonal of Ser. No. 09/019811 filed Feb. 6, 1998, now U.S. Pat. No. 5,950,382.

This invention relates to hollow core door, and corresponding method of making same. More particularly, this invention relates to a hollow core door made from flat door skins that simulates a three-dimensional molded door.

BACKGROUND OF THE INVENTION

Hollow core doors are known in the art. For example, see U.S. Pat. No. 5,560,168, the disclosure of which is incorporated herein by reference. A typical hollow core door includes a perimeter frame with vertically extending stiles and top and bottom rails, with a pair of opposing door skins secured to the frame parameter.

Three dimensional molded hollow core doors are also known. For example, three dimensional molded hollow core doors are disclosed in the aforesaid '168 patent. Molded hollow core doors include at least one door skin which is molded, e.g. so as to define a plurality of recessed panels and adjacent planar portions. Such doors are viewed by many in the trade as aesthetically attractive in certain settings.

Unfortunately, molded hollow core doors, while being attractive, suffer from at least the following problems. First, they are more expensive to make than flat-skinned hollow core doors due to the increased cost of a molded skin relative to a flat skin. Second, problems may arise in the manufacture of molded door skins when molds misregister. Third, the molding requirements limit the types of material (which are often expensive) that the base door skin may be made of.

It is apparent from the above that there exists a need in the art for a door which has the aesthetically pleasing qualities of a molded hollow core door (or of a wood carved door), yet the economic practicality and efficiency of a flat-skinned hollow core door.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described need in the art by providing a hollow core door comprising:

- a door frame including first and second stiles that are oriented substantially parallel to one another, a top rail member, and a bottom rail member;
- first and second door skins, each of said door skins being substantially planar in shape;
- said first door skin affixed to a first side of said door frame and said second door skin affixed to a second side of said door frame;
- at least one of said first and second door skins including the following layers formed thereon:
  - a) a basecoat layer of a first color disposed over substantially an entire surface of said at least one door skin;
  - b) a wood grain pattern layer forming a wood grain pattern being disposed over substantially the entire surface of said at least one door skin;
  - c) a panel ink layer disposed over only a first portion of the surface of said at least one door skin, for the purpose of simulating recessed panels in said at least one door skin;
  - d) a shadow ink layer disposed over only a second portion of the surface of said at least one door skin, wherein said second portion is mostly located on said substrate at locations not including said first portion so that said shadow ink layer is formed where said panel ink layer is not present; and
  - e) a polymerized substantially transparent protective overcoat layer.

In preferred embodiments, each of the first and second skins have each of the same layers a)-e) disposed thereon so that each skin simulates a three dimension molded or carved door skin.

It is further an object of this invention to provide a method of making a flat-skinned door that aesthetically simulates a three dimension molded or carved door.

This invention will now be described with reference to certain embodiments thereof as illustrated in the following drawings.

IN THE DRAWINGS

FIG. 5(*b*) is a plan view of a flat-skinned door that simulates a molded skin door according to still another embodiment of this invention.

FIG. 5(*c*) is a plan view of a flat-skinned door that simulates a molded skin door according to yet another embodiment of this invention.

DETAILED DESCRIPTION OF CERTAIN EMBODIMENTS OF THIS INVENTION

Figure 1:
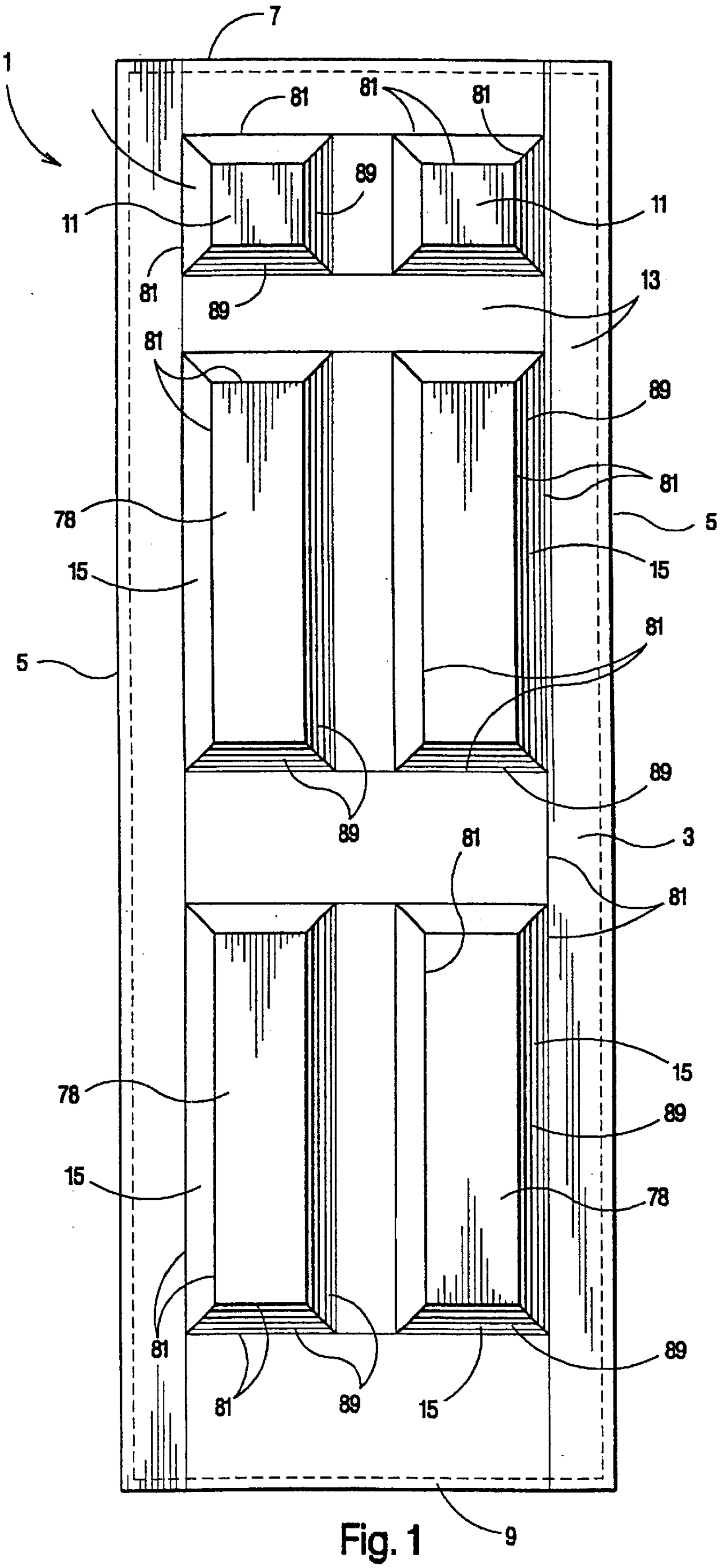
FIG. 1 is a front elevational view of a flatskinned door that simulates a molded skin door, according to an embodiment of this invention.

Referring now more particularly to the accompanying drawings in which like reference numerals indicate like parts throughout the several views.

FIG. 1 is a front elevational view of hollow core door 1 according to an embodiment of this invention. Door 1 includes a pair of opposed substantially flat or planar skins 3 secured to a door frame on opposite sides thereof so as to form the hollow core door. The door frame includes vertically extending opposed elongated stiles 5 and top and bottom rails 7, 9 respectively. The outer peripheries of stiles 5 and rails 7,9 define the outer periphery of the frame for door 1, while the inner edges of these frame members are shown in FIG. 1 in dotted lines as they are under front skin 3. Front door skin 3 is secured to one side of frame members 5, 7, 9 by adhesive, such as polyvinyl acetate, and a similar rear door skin is correspondingly secured to the other side of these frame members. The skins define a hollow area therebetween, which may include a foam core in certain embodiments.

Skins 3 of door 1 are manufactured so as to simulate three dimensional molded door skins, even though skins 3 are substantially flat or planar and are not molded. While we prefer that each of the skins simulates a molded door skin, it is only necessary that one of the skins which faces outwardly from the door have that appearance. Thus, skins 3 are both aesthetically pleasing due to their simulation of molded skins, and at the same time are economically feasible because they are not molded. Each flat skin 3 is made so as to appear to include molded or carved recessed panels 11 and/or adjacent planar portions 13, as well as shadowed angled connecting areas 15.

Figure 2:
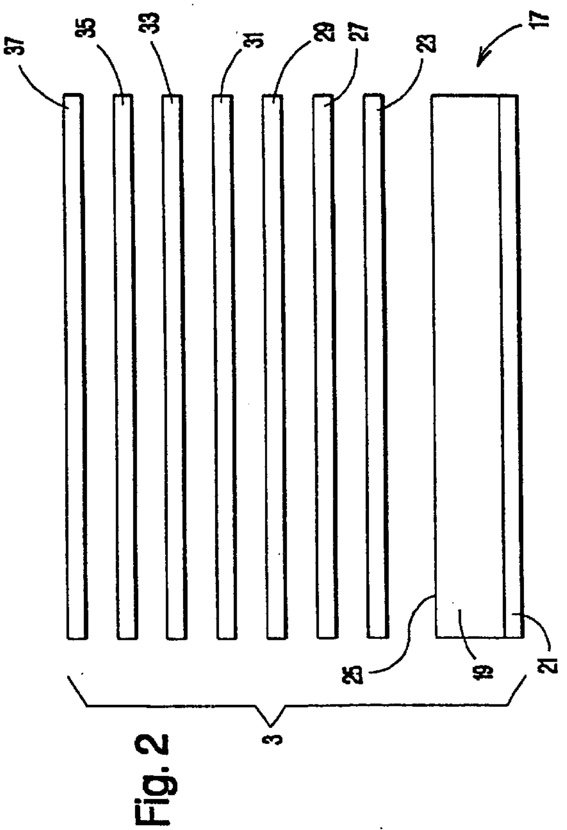
FIG. 2 is an exploded cross sectional view of a flat door skin used on one side of the frame of the FIG. 1 door.

Referring to FIG. 2, each skin 3 of door 1 includes the following layers: substrate 17 (e.g. of a composite wood material such as press board, medium density fiberboard, or similar dimensionally stable material) including porous composite layer 19 and possibly backing layer 21, sealer 23 applied to porous surface 25 of the substrate to create a uniformly impermeable surface on which to apply subsequent materials, first colored viscous basecoat 27 and second viscous basecoat 29 of the same color (both roller applied) applied to the sealed surface, with the basecoat color selected to reflect the general background ambient color of the wood being simulated by the door, printed wood grain pattern 31 of an acrylic print ink or the like, printed ink layer 33 for forming line features on each skin 3 that simulate panels 11 and planar portions 13, printed ink layer 35 for forming line features on the outside of each skin 3 that simulate angled shadowed portions 15, and finally protective coating 37 which preferably is not stain accepting. Protective coating 37 is applied to protect the wood grain pattern and is transparent, so that the printed wood grain 31 and printed mold simulations 33 and 35 are visible through coating 37. Coating 37 is hard enough so as to allow the door and/or skin to be stacked and shipped horizontally, without substantial degradation occurring to the outer surface. As will be described below, each of layers 33 and 35 (and optionally layer 31) is discontinuous across the substrate/door skin so as to form and define different discrete portions that simulate panels 11 and planar portions 13.

Figure 3:
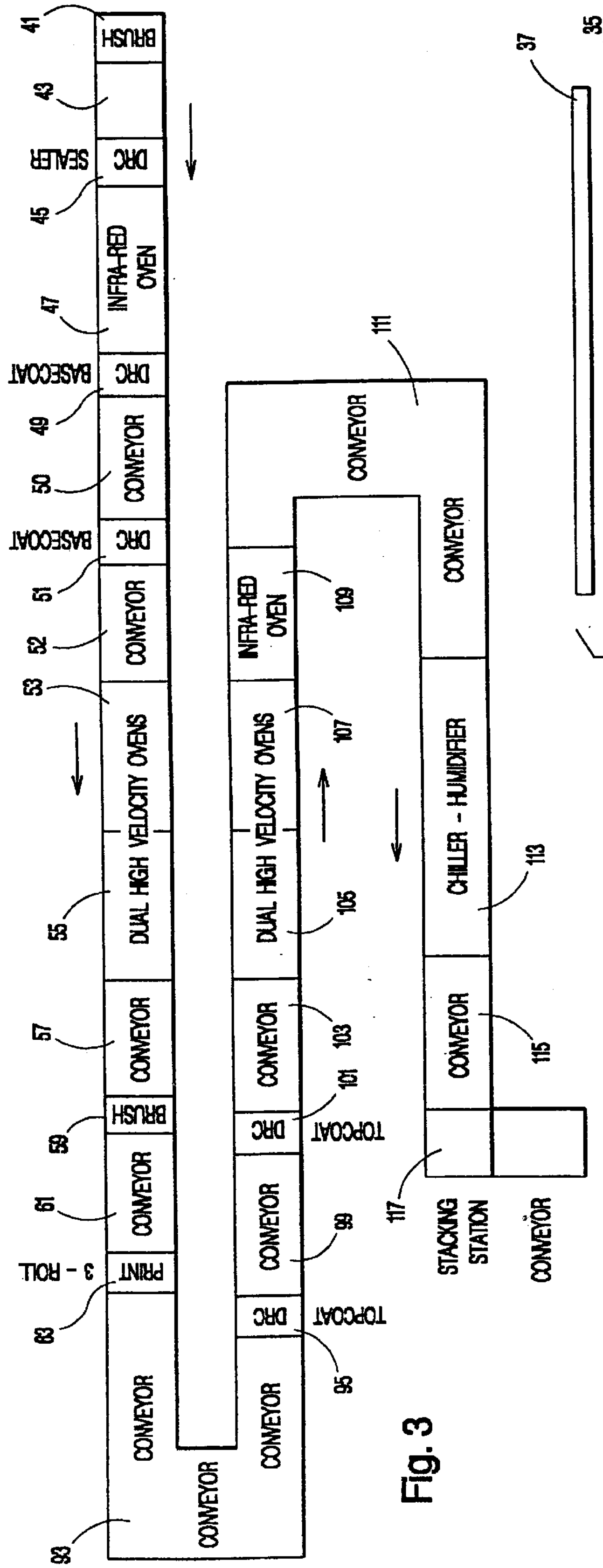
FIG. 3 is a schematic illustration according to an embodiment of the instant invention depicting an assembly line for manufacturing flat-skinned hollow core doors according to this invention.
Figure 4:
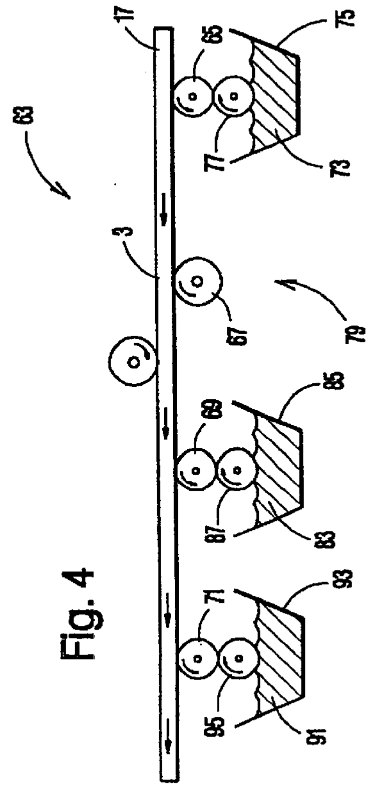
FIG. 4 is a side partial cross sectional view of the three-roll printing process used in the FIG. 3 manufacturing process according to certain embodiments of this invention.
Figure 5C:
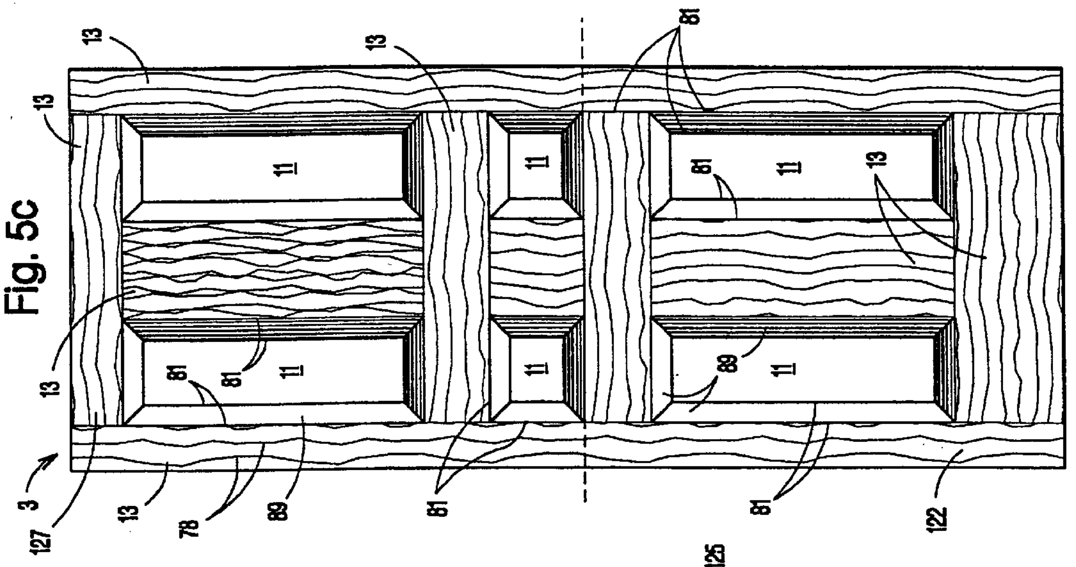
FIG. 5(*a*) is a plan view of a flat-skinned door that simulates a molded skin door according to another embodiment of this invention.
Figure 5B:
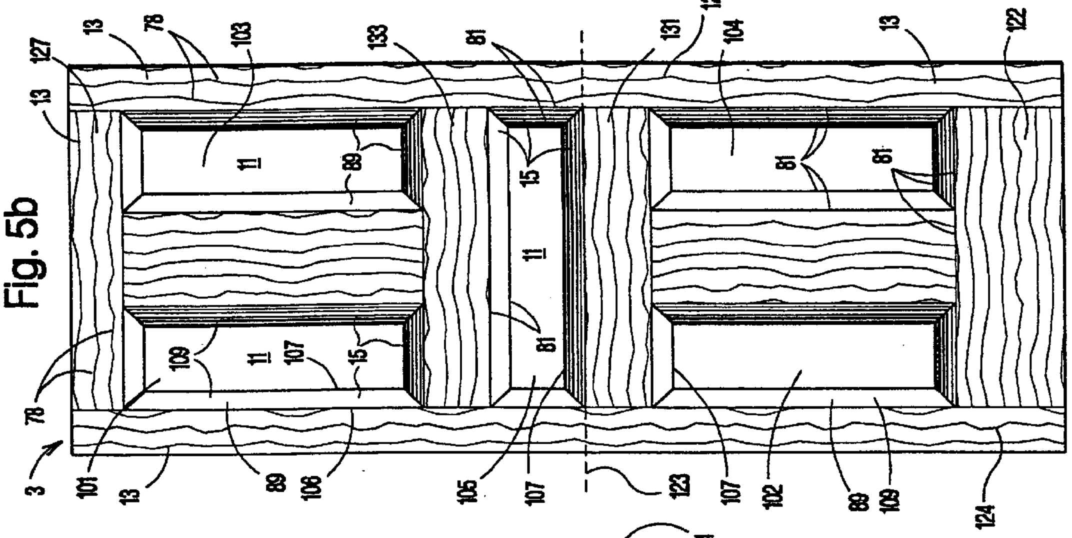
Figure 5A:
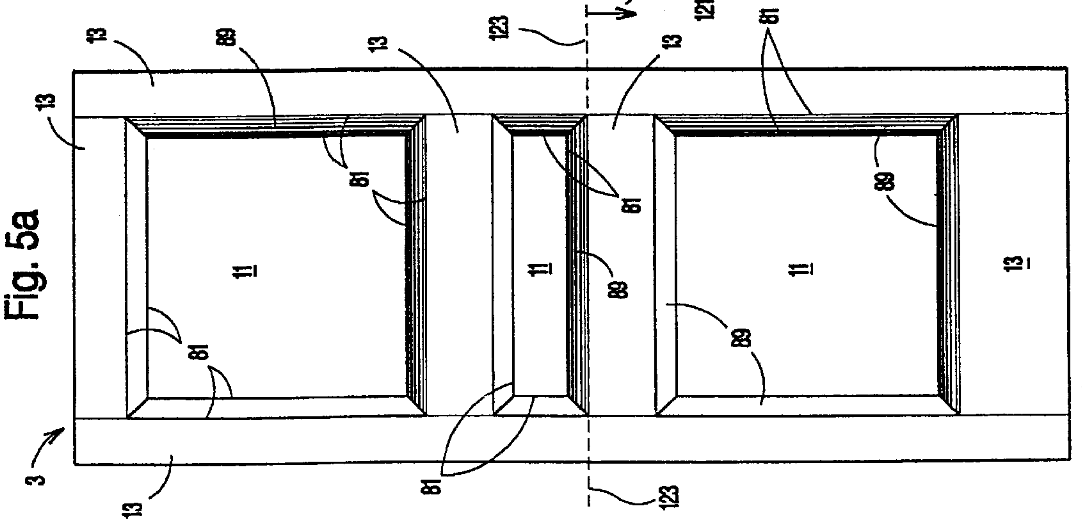

A method of manufacturing door 1 according to an embodiment of this invention can be understood by referring to FIGS. 3 to 5. It should be understood that these figures are for illustrative purposes only and the layout and size of each element is not meant to be limiting. For purposes of simplicity, the method of manufacture will be described with reference to door skins utilizing a composite wood substrate 17, but it should be understood that substrate 17 may be of other materials such as a non-porous material, fiberglass material, or the like.

Substrate 17 enters a horizontal conveyor system (see FIG. 3) at multibrush cleaning station 41 with surface 25 facing the brushes. Surface 25 of substrate 17 is cleaned using multi-rotary brushes, which clean the surface; adhesion of subsequent layers may be adversely affected if surface 25 is not cleaned. Conveyor portion 43 transports clean substrate 17 to direct roll coating station 45, where liquid sealer 23 is applied to surface 25. Sealer 23 is an acrylic sealer, such as available from Akzo Coatings, Inc. under its product number 641-Y029-42. The conveyor system then transports sealed substrate 17 to an infrared oven 47 which cures and sets sealer 23. While we prefer that sealer 23 be cured, other non-curing sealers may be used in the practice of this invention. Should substrate 17 be non-porous (e.g. because it is metal), than a sealer is not required.

Substrate 17 having dry sealer 23 thereon then enters a first direct roll coating station 49 where first liquid basecoat 27 is applied. Basecoat 27 may be a low volatile organic content (VOC) water based vinyl acrylic copolymer having a viscosity of about 38 seconds on a #2 Zahll cup in certain embodiments such as available from Akzo under product number 651-W029-12. Conveyor 50 then transports the substrate having wet basecoat 27 to second direct roll coating station 51, where second basecoat layer 29 is applied over the first basecoat. Second basecoat layer 29 is applied, and each basecoat layer 27, 29 has a thickness of about 0.003" in certain embodiments. Second basecoat 29 is allowed to level while being transported on the conveyor. The controlled viscosity of the basecoat layers results in tactile qualities, when dry, of raw wood. Multiple base coat layers are preferred in order to insure surface coverage while minimizing the thickness of each such layer.

Conveyor 52 then transports the substrate having two coats of wet basecoat to two sequential dual high velocity ovens 53 and 55. The operation of ovens 53 and 55, and other elements described herein are described in U.S. Pat. No. 5,597,620, the disclosure of which is incorporated herein by reference. Oven 53 is set to about 250 degrees F. in order to prevent the basecoat from forming a skin, and oven 55 is set to about 375 degrees F. The dwell time of the substrate in ovens 53 and 55 is about 25 seconds, with the surface temperature when exiting oven 55 being about 131 degrees F. Ovens 53 and 55 may be convection ovens, which cause the solvent to be moved relatively rapidly away from the substrate. Ovens 53 and 55 dry and set basecoat layers 27 and 29.

Conveyor portion 57 then transports the substrate to brush station 59. Basecoat layers 27 and 29 are permitted to cool in ambient air during transport because of the dwell time achieved. The basecoats should be dry and hard, so that the basecoats are not malleable at station 59. At station 59, the outer surface of basecoat layer 29 is burnished with high speed rotary brushes, which remove grooves in the basecoat surface and any fibers or the like lying upon the basecoat surface.

Conveyor portion 61 then transports the brushed substrate to three-stand rotogravure print station 63. While on conveyor 61, the burnished surface of basecoat 29 cools to remove heat from burnishing.

Three-stand print station 63 is shown in more detail in FIG. 4. Print station 63 includes wood grain printing roll 65 which applies wood grain simulating ink layer 31 to the substrate, wood grain print transfer roll 67, panel print roll 69 which applies recessed panel 11 simulating ink layer 33, and shadow print roll 71 which applies shadow 15 simulating ink layer 35.

As shown in FIG. 4, substrate 17 having layers 23, 27, and 29 thereon enters three-stand print station 63. Roll 65 prints a wood grain pattern layer 31, simulating a wood grain such as teak, oak, or mahogany, on the substrate over basecoat layers 27 and 29. This wood grain pattern may be printed in certain embodiments with an acrylic print ink 73 such as available from Akzo under their product number 699-C029-370A. The print ink may also be a "puff" ink, that is one that expands upon thermal actuation. Puff ink thus helps to give the skin the feeling of a three dimension wood grain, further enhancing its attractiveness. Reservoir 75 houses wood grain printing ink 73, and rotating ink transfer roll 77 dips into ink 73 during rotation, and thereby transfers ink 73 to rotating wood grain print roll 65 that includes a raised inverted wood grain pattern etched, molded, or otherwise formed in its roll surface. In such a manner, roll 65 applies wood grain pattern layer 31 to substrate 17 over the basecoat layers. Exemplar wood grain patterns are shown by reference numerals 78 in FIGS. 1 and 5(*b*)–5(*c*). In certain embodiments, wood grain layer 31 is applied over substantially the entire surface of the substrate.

The print station conveyor then transports the substrate having wood grain layer 31 thereon to rotary print transfer station 79 that includes transfer roll 67. During this approximate 5–15 second transport, wood grain layer 31 begins to dry, and becomes tacky. High pressure rubber roll 67, when rolling the substrate over the tacky wood grain layer, picks up part of tacky layer 31 and transfers it to a circumferentially spaced location on the substrate where the tacky portion is reapplied onto the basecoat. Thus, the wood grain pattern 31 may have voids and/or skips defined therein to enhance uniqueness of layer 31. After layer 31 has been rolled with transfer roll 67, layer 31 simulates distressed wood grain.

Still referring to FIG. 4, after the substrate with wood grain layer 31 exits transfer roll 67, it proceeds toward panel print roll 69. In certain embodiments, layer 31 is allowed to substantially dry (i.e. to prevent bleeding or smearing) before substrate 17 reaches roll 69. The substrate is registered by means known in the art prior to reaching roll 69, in order to ensure that layers 33 and 35 are applied on each substrate 17 that comes through in the same location relative to both one another and to the substrate edges. As substrate 17 is conveyed past roll 69, this panel print roll 69 contacts the substrate and applies or prints ink layer 33 thereon over wood grain layer 31, with layer 33 forming/printing lines 81 [see FIGS. 1 and 5(*a*)–5(*c*)] on the substrate in order to simulate three dimension molded panels 11 and planar portions 13. Thus, layer 33 is made up of lines 81 that are applied to the substrate. Panel ink 83, held in reservoir 85, is transferred to roll 69 by rotating transfer roll 87 so that roll 69 comes into rotating contact with the substrate in order to apply panel simulating layer 33 thereto over wood grain pattern 31.

After lines 81 (i.e. panel simulating layer 33) have been applied to the substrate by roll 69, substrate 17 is conveyed toward shadow applying roll 71. In certain embodiments, ink layer 33 is permitted to dry during conveying between rolls 69 and 71. When substrate 17 reaches shadow print roll 71, this roll applies shadow layer 35 to substrate 17 over top of the basecoat layers and after panel layer 33 has dried. Shadow layer 35 defines shadow lines/patterns 89 [(see FIGS. 1 and 5(*a*)–5(*c*)] which simulate angle portions 15 that connect the substantially planar bottoms of panels 11 to planar portions 13. In certain embodiments, shadow layer 35 (and thus shadows 89) is only applied to areas simulating these angles portions, and thus is mostly applied directly over the woodgrain layer where panel layer 33 is not present. The shadows 89 give the resulting image an appearance of depth thus enhancing the simulated three-dimensional appearance. Thus, roll 71 has a pattern defined in its outer roll surface that represents the inverse of shadows 89 to be printed on the substrate. Shadow ink 9.1, held in reservoir 93, is transferred to print roll 71 by transfer roll 95 so that roll 71 applies shadow 89 layer 35 to the substrate over the basecoat layers as roll 71 contacts the substrate in a rotating manner. Again, it is important that substrate 17 be registered in the print station, so that the rolls are aligned and ink applied in the correct locations (e.g. so that shadow layer 35 can always be applied at least in angle simulating areas 15 between lines 81 formed by roll 69).

Inks 73, 83, 91, as well as the basecoat color, may all be different colors according to certain embodiments of this invention. Thus, when these are all of different colors, the process described herein is akin to a fourcolor printing process which can achieve superior visual results and be aesthetically pleasing to those viewing the end product. In other words, the basecoat may be of a first color, the wood grain of a second color, the paneling of a third color, and the shadows of a fourth color. The print image of formed by the various layers are preferably formed from a high quality photograph of a molded skin to be simulated, with the photograph being separated by means known in the art, and printing plates (i.e. rolls) prepared. High quality printing results.

After substrate 17 has passed by roll 71, and thus layers 23–35 have been applied thereto, conveyor portion 93 transports the substrate away from print station 63 and toward direct roll coater 95 as shown in FIG. 3. While on conveyor 93, the ink of layer 35 dries. Direct roll coater 95 applies a first layer of a protective coating 37. Coating 37 may be, for example, a nonstainable protective polymerizable protective coating. The first layer of coating 37 may be about 0.003" thick in certain embodiments.

Conveyor portion 99 then transports the substrate to second direct roll coater 101 (which is optional) that applies a second layer of coating 37. Two layers are prefered. Conveyor portion 103 then transports substrate 17 to dual high velocity ovens 105 and 107. Before reaching the ovens, the substrate remains on conveyor portion 103 about 3 seconds to allow the protective coating 37 to level out. Dual high velocity ovens 105 and 107 set coating 37 and remove low volatile organic content solvents therefrom. Oven 105 may be set to about 275 degrees F. and oven 107 to about 300 degrees F. Alternatively, the protective coat may be one not requiring thermal polymerization.

A conveyor then transports the substrate to infrared oven 109. Oven 109 may be set to about 1700 degrees F. so that full polymerization of coating 37 can be achieved. Full polymerization is achieved at, e.g., about 300 degrees F., and occurs at the surface of coating 37 at a transport speed of about 200 feet per minute. Satisfactory polymerization may be achieved at a surface temperature of about 220 degrees F. Polymerization of protective coating 37 occurs while substrate 17 is in oven 109.

Conveyor portion 111 then transports substrate 17 having a polymerized coating 37 thereon to a combination chiller-humidifier 113. During this time, the product cools in ambient air. Chiller-humidifier 113 rapidly reduces the temperature of the product to about 124 degrees F, and rehumidifies the product prior to stacking. Conveyor portion 115 then transports the substrate to stacking station 117 where substrates 17 are lifted by a fork lift for transfer to a stack of similar substrates.

Substrates 17, including layers 23–37 thereon, are now in the form of substantially flat or non-molded door skins which visually simulate on one side molded skins and are thus aesthetically pleasing. These skins are then secured to door frames (5, 7, 9) on opposite sides thereof in order to form hollow core doors 1 according to this invention (with the coated surface of the skins facing outward away from the frame). For example, two substantially identical door skins as described above may be secured to opposite sides of a door frame in order to fabricate a flat-skinned hollow core door that aesthetically simulates a three dimension molded or carved door that includes panels 11 and planar portions 13.

FIGS. 5(*a*), 5(*b*), and 5(*c*) illustrate three different flat-skinned non-molded doors that may be made according to this invention. Each door, while having substantially flat and non-molded skins 3, has simulated thereon a three-dimension molded or carved door as well as a wood grain pattern. Each of these doors is designed in a manner such that each of print rolls 69 and 71 can partially repeat itself one time when contacting the substrate 17. With regard to FIG. 5(*b*) for example, substrate 17 is fed past rolls 69 and 71 in contacting relation in feed direction 121. The first complete rotation of roll 69 on the substrate applies all of lines 81 on one side of dotted line 123 including lines 81 of center panel 105, while the second rotation of roll 69 on the substrate (i.e. the partial repeat rotation) applies all lines 81 on the other side of line 123 including the lines 81 defining panels 102 and 104. In a similar manner, the first complete rotation of roll 71 on the substrate applies all of shadows 89 on only one side of line 123 while the second or partial repeat rotation of roll 71 on the substrate applies the shadows 89 on the other side of line 123. Thus, certain panel and shadow patterns applied to the substrate for simulating the molded door are mirrored about line 123 so as to enable the printing rolls to more efficiently apply layers 33 and 35.

In preferred embodiments, rollers 69 and 71 repeat at least about 1.5 times on each substrate so that a substantial portion of the image on each such roller is transferred to each substrate at least two times.

Referring to FIG. 5(*b*) for example, lines 81 of layer 33 outline a plurality of different simulated panels 11 on the face of the skin In this embodiment, panel 101 is substantially linearly aligned with but spaced from panel 102, while panel 103 is substantially linearly aligned with but spaced from panel 104. Meanwhile, central panel 105 is not linearly aligned with either of panels 101–104. In view of this orientattion, roll 69 during its first revolution on the skin can deposit lines 81 forming panels 101, 103, and 105, and on its second rotation on the skin can deposit lines 81 forming panels 102 and 104. Each panel 101–105 includes both an outer defining line 106 (i.e. part of layer 33) that defines the outer limit/periphery of the simulated panel and an inner line 107 (also part of layer 33) that defines the periphery of the inner substantially planar portion of each panel. Between lines 106 and 107 in each panel is simulated angled area 15 which receives shadow layer 35. Thus, the vertically extending inner peripheral lines 107 of panel 101 are linearly aligned with the vertically extending inner peripheral lines 107 of panel 102, and the horizontally extending inner peripheral lines 107 of panel 101 are parallel to the horizontally extending inner peripheral lines 107 of panel 102. The same is true for panel 103 as compared to panel 104. Likewise, the vertically extending outer peripheral lines 106 of panel 101 are linearly aligned with the vertically extending outer peripheral lines 106 of panel 102, and the (the inner vertically extending lines 107 of panels 101 and 102 are also linearly aligned with one another). The same is again true for panels 103 and 104. Furthermore, vertically extending shadow portions 109 (of portions 89) in panels 101 and 102 are both (i) located between layer 33 lines 106 and 107, and (ii) are substantially linearly aligned with one another. This is also the case for panels 103 and 104. The horizontally extending shadow portions 89 in panels 101 and 102 are substantially parallel to one another, as are the horizontally extending shadow portions in panels 103 and 104. The FIG. 5(*b*) door further includes simulated planar portions 13 which are outside of the simulated panels 11. Bottom planar portion 122 is defined between vertically extending planar portions 124 and 125, with bottom planar portion being located between the door's bottom edge and simulated panels 102 and 104 so as to space these two panels from the bottom edge of the door. Upper planar portin 127 is also located between planar portions 124 and 125, but at the top of the door, so as to space panels 101 and 103 from the door's top edge. Planar portions 122 and 127 are substantially parallel to one another, as are planar portions 124 and 125. Central planar portions 131 and 133 are parallel to one another and sandwich therebetween central panel 105.

The patterns which are engraved, molded, or otherwise formed on print rolls 69 and 71 may be obtained as follows. A high quality photograph may be taken of a molded door including panels 11 and planar portions 13 to be simulated. This photograph may then be processed so that the lines defining panels 11 and planar portions 13 are patterned and formed into the peripheral surface of roll 69, while the shadow lines are patterned and formed into the peripheral surface of roll 71 (i.e. raised portions of the pattern on the roll surface receive ink from the corresponding transfer roll and deposit this ink onto substrate 17, so that grooves in the roll peripheries represent the inverse of what is to be printed on substrate 17). Then, when rolls 69 and 71 apply their corresponding inks to the door skin substrate, the original photograph of the door to be simulated is reproduced on the viewing surface of door skin substrate 17.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A method of manufacturing a flat-skinned hollow core door that aesthetically simulates a three-dimension molded or carved door, the method comprising the steps of:

providing a first substantially flat or planar door skin substrate;

applying at least one basecoat layer on the first door skin substrate across substantially an entire surface of the first door skin substrate;

the at least one basecoat layer substantially drying;

providing a first roll having a wood grain pattern defined in a peripheral surface thereof;

applying in liquid form a wood grain pattern layer on the first door skin substrate over the at least one basecoat layer, by rotatingly contacting the first door skin substrate with the first roll;

the wood grain pattern layer substantially drying;

providing a second roll having a panel simulating pattern defined in a peripheral surface thereof;

applying a panel simulating layer including the panel simulating pattern on the first door skin substrate over the at least one basecoat layer and over the wood grain pattern layer by rotatingly contacting the first door skin substrate with the second roll so that the panel simulating pattern simulates carved or molded panels;

providing a third roll having a shadow pattern defined in a peripheral surface thereof;

applying a shadow simulating layer including the shadow pattern on the first door skin substrate over the at least one basecoat layer and the wood grain pattern layer by rotatingly contacting the first door skin substrate with the third roll so that the shadow pattern simulates shadows between molded or carved panels;

applying a substantially transparent protective coating layer on the first door skin substrate over the shadow simulating layer, over the wood grain pattern layer, over the panel simulating layer, and over the at least one basecoat layer;

polymerizing the protective coating layer;

providing a door frame including first and second stiles that are aligned substantially parallel to one another, the door frame further including a top rail and a bottom rail providing a second door skin substrate; and securing the first door skin substrate to a first side of the door frame and securing the second door skin substrate to a second side of the door frame so as to form a hollow core door that aesthetically simulates a three dimension molded or carved door.

2. The method of claim 1, further comprising the steps of rotatingly contacting the first door skin substrate with the second roll through at least 1.5 complete revolutions of the second roll so that a substantial part of the panel-pattern applied to the first door skin substrate by the second roll is repeated on the first door skin substrate and is mirrored about a line defining the end of the first complete rotation.

3. The method of claim 2, further comprising the steps of rotatingly contacting the first door skin substrate with the third roll through at least 1.5 complete revolutions of the third roll so that a substantial part of the shadow pattern applied to the first door skin substrate by the third roll is repeated about said line.

4. The method of claim 1, further comprising the steps of: applying two basecoat layers of a first color and passing the first door skin substrate through at least a first high velocity oven after the two basecoat layers have been applied but before the wood grain pattern layer has been applied.

5. The method of claim 1, wherein each of said first, second, and third rolls is a print roll and is in contact with a corresponding ink transfer roll, and wherein each of the corresponding ink transfer rolls is at least partially submerged in a reservoir housing ink.

6. The method of claim 1, wherein the recited steps are performed in the order recited.

7. A method of manufacturing a flat-skinned hollow core door that aesthetically simulates a three-dimensional molded or carved door, the method comprising the steps of:

providing a first substantially flat or planar door skin substrate;

applying at least one basecoat layer on the first door skin substrate across substantially an entire surface of the first door skin substrate;

applying in liquid form a wood grain pattern layer on the first door skin substrate over the at least one basecoat layers, by rotatingly contacting the first door skin substrate with a first roll;

substantially drying the wood grain pattern layer;

applying a panel simulating layer including a panel simulating pattern on the first door skin substrate over the at least one basecoat layer and over the wood grain pattern layer by rotatingly contacting the first door skin substrate with a second roll so that the panel simulating pattern simulates carved or molded panels;

applying a shadow simulating layer including a shadow pattern on the first door skin substrate over the at least one basecoat layer and the wood grain pattern layer by rotatingly contacting the first door skin substrate with a third roll so that the shadow pattern simulates shadows between carved or molded panels;

applying a substantially transparent protective coating layer on the first door skin substrate over the shadow simulating layer, over the wood grain pattern layer, over the panel simulating layer, and over the at least one basecoat layer;

providing a door frame including first and second stiles that are aligned substantially parallel to one another, the door frame further including a top rail and a bottom rail providing a second door skin substrate; and securing the first door skin substrate to a first side of the door frame and securing the second door skin substrate to a second side of the door frame so as to form a hollow core door that aesthetically simulates a three dimensional molded or carved door.

8. A method of manufacturing a flat-skinned hollow core door that aesthetically simulates a three-dimension molded or carved door, the method comprising the steps of:

providing a first substantially flat or planar door skin substrate;

applying at least one basecoat layer having a first color on the first door skin substrate across substantially an entire surface of the first door skin substrate;

the at least one basecoat layer substantially drying;

providing a first roll having a wood grain pattern defined in a peripheral surface thereof;

applying in liquid form a wood grain pattern layer on the first door skin substrate over the at least one basecoat layer;

providing a second roll having a panel simulating pattern defined in a peripheral surface thereof;

applying a panel simulating layer including a panel simulating pattern over only a first portion of the surface of the first door skin substrate, for the purpose of simulating recessed panels in said first door skin;

applying a shadow simulating layer including a shadow pattern on only a second portion of the surface of the first door skin substrate, wherein the second portion is mostly located on the first door skin substrate at locations not including the first portion so that the shadow simulating layer is mostly formed over the wood grain pattern layer where the panel simulating layer is not present, and wherein the second portion is of greater area than the first portion;

applying a substantially transparent protective coating layer on the first door skin substrate over the shadow simulating layer, over the wood grain pattern layer, over the panel simulating layer, and over the at least one basecoat layer;

polymerizing the protective coating layer;

providing a door frame including first and second stiles that are aligned substantially parallel to one another, the door frame further including a top rail and a bottom rail;

providing a second substantially flat or planar door skin substrate; and securing the first door skin substrate to a first side of the door frame and securing the second door skin substrate to a second side of the door frame so as to form a hollow core door that aesthetically simulates a three dimensional molded or carved door.

* * * * *